United States Patent [19]

Bradshaw et al.

[11] 4,149,622

[45] Apr. 17, 1979

[54] MAIL SELECTION AND METERING DEVICE

[75] Inventors: Robert S. Bradshaw, Broomall; James R. Hunter, Chadds Ford; Sebastian J. Lazzarotti, Broomall, all of Pa.

[73] Assignee: Burroughs Corporation, Detroit, Mich.

[21] Appl. No.: 864,385

[22] Filed: Dec. 27, 1977

[51] Int. Cl.[2] ........................ B65G 43/00; B65G 47/12

[52] U.S. Cl. .................................... 198/444; 198/524; 198/530; 209/900; 271/64

[58] Field of Search ............... 198/358, 359, 360, 369, 198/444, 524, 530; 209/82, DIG. 1, 707, 900; 214/1 M; 271/64, 184, 225

[56] References Cited

U.S. PATENT DOCUMENTS 3,977,533 8/1976 Hills et al. ........................... 214/1 M

*Primary Examiner*—Robert B. Reeves

*Assistant Examiner*—Jeffrey V. Nase

*Attorney, Agent, or Firm*—Francis A. Varallo; Edmund M. Chung; Kevin R. Peterson

[57] ABSTRACT

A device is described for capturing certain predetermined types of mail pieces from a moving mail flow and for regulating the subsequent delivery thereof to processing equipment. The device is comprised of a receiving station and a delivery station linked by a common narrow transport. The latter forms a shallow shelf or ledge situated at the bottom of the receiving station and adapted at any given time to catch a limited number of certain types of mail from a mixed stream as it flows through the station. Additionally, the receiving station includes a vane-like member for selectively deflecting all of the mail from the transport. The operation of the member is under control of the delivery station and depends upon whether or not mail pieces awaiting further processing downstream are present in the station. The motion of the transport is controlled by both the delivery station and the processing equipment to insure that they will be kept continuously supplied with mail.

10 Claims, 3 Drawing Figures

MAIL SELECTION AND METERING DEVICE

CROSS-REFERENCE TO RELATED APPLICATION

In copending patent application U.S. Ser. No. 864,258 for "Mail Singulation and Culling System" by James R. Hunter et al., there is described a mail processing system in which the mail selection and metering device of the present invention finds particular utility. Both the last mentioned and the present application are assigned to the same assignee.

BACKGROUND OF THE INVENTION

Collection mail may be comprised of many items which are extremely difficult to process by automated equipment. Yet the need exists in mail handling systems for a device which will accept collection mail and immediately cull therefrom most thick objects such as small parcels, rolls and slugs, the last being objects of irregular dimensions which preclude their stacking one above the other. Of perhaps greater importance, the device should be able to selectively capture certain mail pieces having a preferable size, shape, or center of gravity from the moving stream of collection mail for forwarding to subsequent equipment. The number of documents captured must be limited to prevent overflow. Also, jams or other interferences with normal mail flow must be avoided.

The document selection and metering device of the present invention fulfills these requirements.

SUMMARY OF THE INVENTION

In accordance with the present invention, the device is comprised of a receiving station having at least one compartment and a delivery station associated with the latter. The compartment includes a backplate inclined from the horizontal. Located at the bottom of the backplate is a horizontal conveyor belt which also traverses the delivery station. The belt forms a narrow shelf or ledge capable of capturing at any given time a limited number of certain types of mail pieces oriented on their edges, from a mixed stream being deposited in the receiving station compartment.

The compartment backplate includes a vane-like member which may be extended over the belt to preclude any mail from parking thereon. This mail enters a chute disposed below the receiving station and is recirculated back into the station in a continuous flow. The operation of the deflecting means is under the control of sensing means located in the delivery station. If the latter station is unoccupied, the vane will be retracted and the mail pieces collected on the common transport belt will be delivered into the station for further processing downstream. If occupied, the extended vane prevents any mail from accumulating on the belt and causing an overflow in the delivery station.

It is therefore apparent that the receiving station will automatically reject items such as small parcels, rolls and slugs because they will not be retained on the narrow ledge formed by the transport belt. Only certain types of mail, such as letters and flats will be captured and even these in limited numbers. Because of this, the device of the present invention is inherently free from jams and will not impede the normal flow of mail.

These and other features and advantages of the present invention will become more fully apparent in the detailed description and mode of operation which follows:

DESCRIPTION OF THE PREFERRED EMBODIMENT

Figure 1:
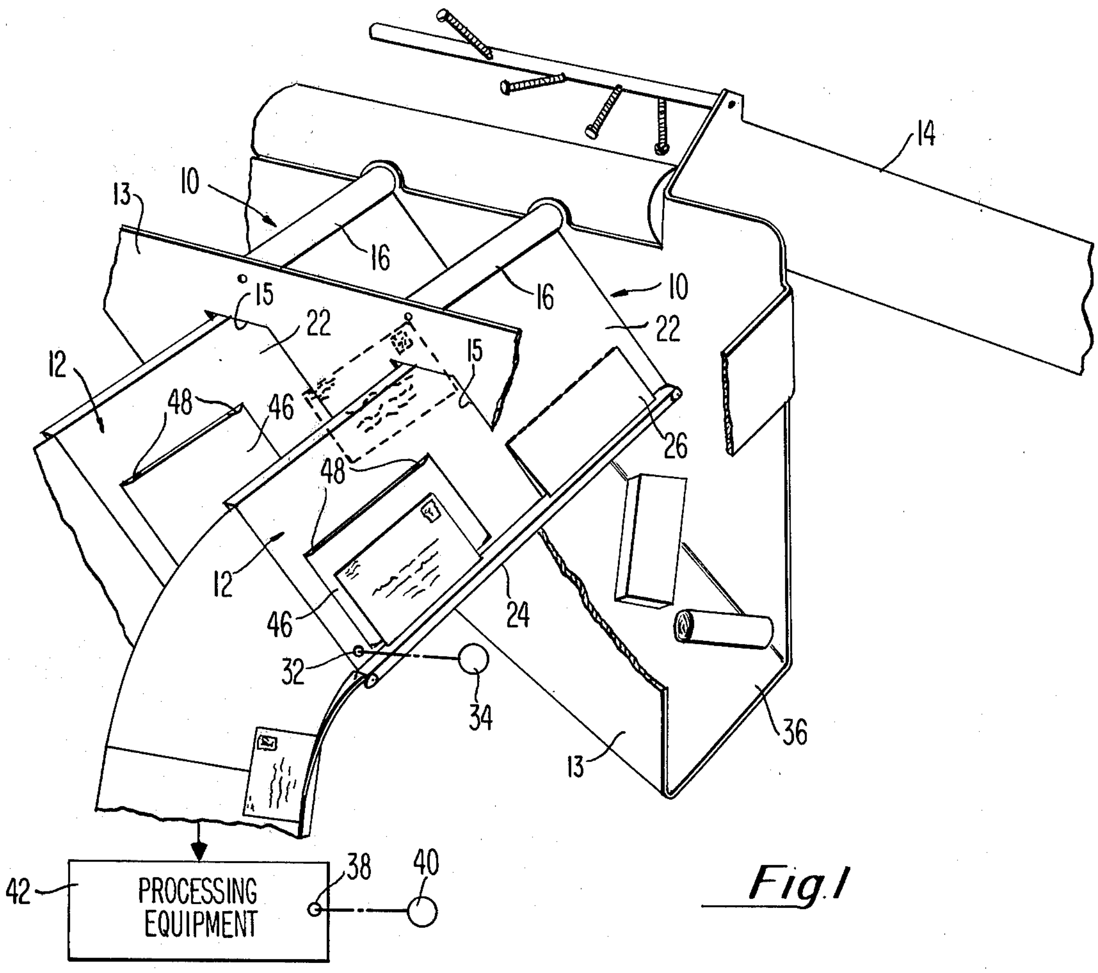
FIG. 1 is a pictorial view of a plurality of mail selection and metering devices of the type contemplated by the present invention, each device comprising a receiving station and a delivery station.

Two mail selection and metering devices each comprised of a receiving station 10 and a delivery station 12 are illustrated in FIG. 1. The pictorial illustration also indicates the existence of a third device. Accordingly, it is apparent that a plurality of such devices may be employed in a system depending upon the desired mail throughput.

Each receiving station 10 is partially separated from its associated delivery station 12 by a partition 13. The partition 13 includes an opening 15 of sufficient magnitude to permit edge-oriented mail pieces to be conveyed from the receiving station 10 to its associated delivery station 12 in a manner to be described hereinafter.

Figure 2:
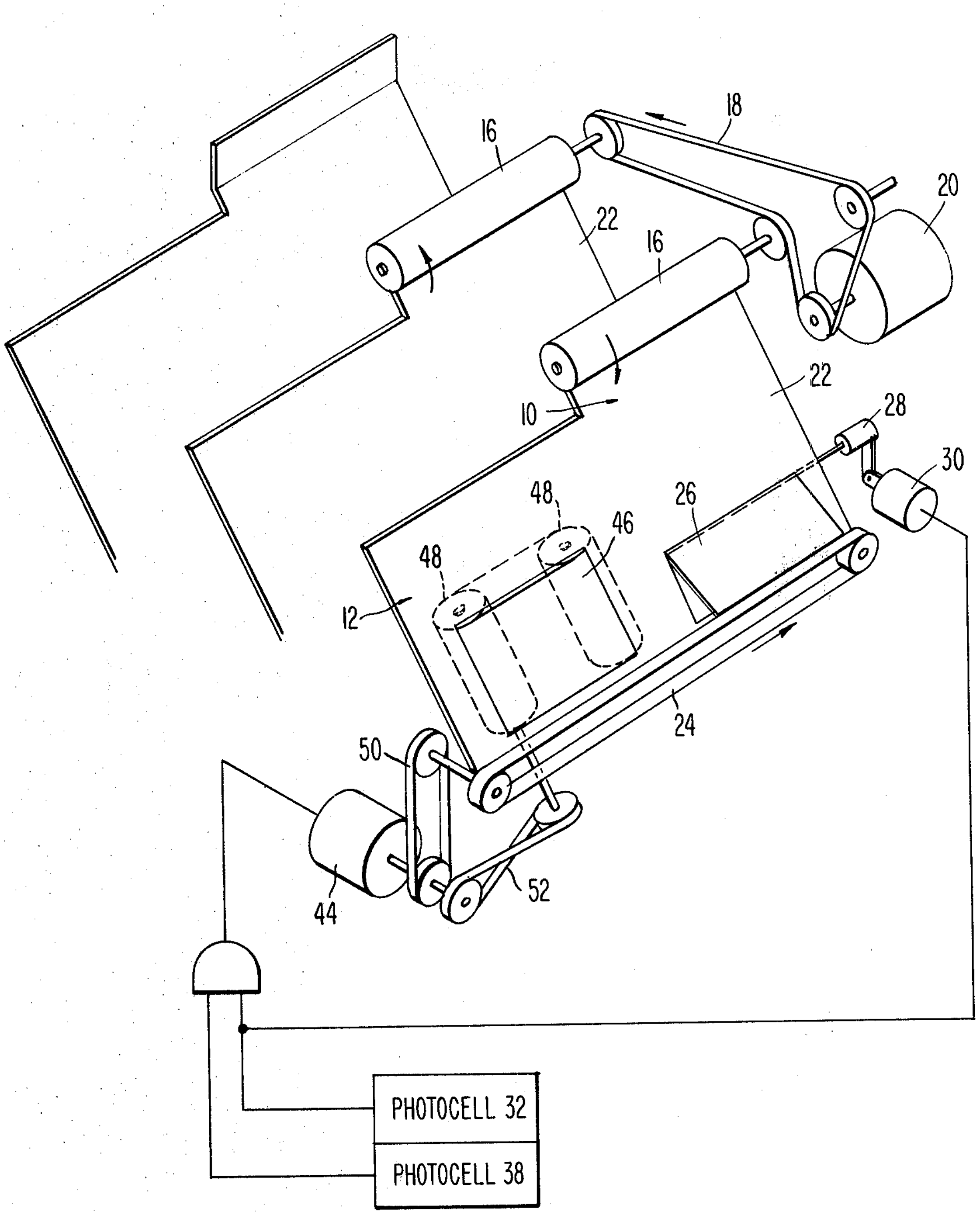
FIG. 2 is a semi-pictorial illustration of the mechanical and electro-mechanical elements utilized to implement the functions provided by the device of FIG. 1.

Since the devices of FIG. 1 are identical, the following description will concentrate on the details and operation of one of them. Reference should also be made to FIG. 2, which depicts the implementation of the functions of the receiving and delivery stations in terms of the conveyors, drive means and electro-mechanical elements utilized therein.

Mail from an inclined conveyor 14 partially seen in FIG. 1, enters the respective compartments of the receiving stations. Two rollers 16 are rotated in opposite directions by belt 18 and motor drive means 20, as seen in FIG. 2. The rotation of rollers 16 aids in dividing the mail flow from the input conveyor and prevents mail pieces from hanging on the partitions between receiving stations. Moreover, the rollers tend to divert mail from the center compartment to the outer compartments in an arrangement which comprises three contiguous receiving stations.

With continued reference to FIGS. 1 and 2, each of the receiving stations has a backplate 22 inclined approximately between 45 and 60 degrees from the horizontal. Located at the bottom of the backplate is a horizontal conveyor belt 24 positioned approximately 90 degrees with the backplate so as to form a shelf approximately one-fourth inches wide. The backplate 22 contains a vane like member 26, hinged on its upper extremity so as to permit its lower opposite extremity to pivot therearound. This pivotable vane is attached to a moveable arm 28, which in turn is coupled to a solenoid actuator 30. Motion of the vane in a forward direction causes the lower extremity thereof to cover the horizontal belt 24.

In this latter condition, the mail pieces leaving the inclined conveyor will drop into the compartment, contact the backplate 22, and slide down the plate. On the other hand, when the delivery station is unoccupied by mail as indicated by photocell 32 being light (illumination being provided by source 34), the signal level applied by the photocell to solenoid actuator 30 is such that vane is retracted; the conveyor belt 24 located at the bottom of the backplate is uncovered and the shelf formed thereby is able to catch mail pieces. The number of pieces captured is a function of the thickness of the mail and the width of the shelf. When the shelf is covered by one or more mail pices, any excess mail continues past the shelf to the bypass 36 chute to be recirculated.

Figure 3:
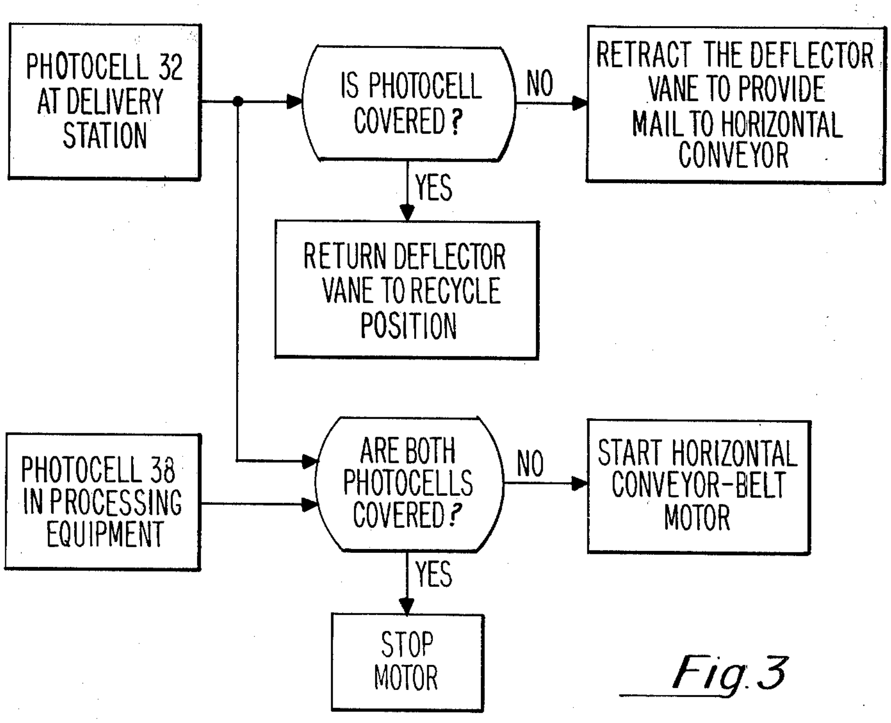
FIG. 3 is a flow diagram illustrating the control exercised by photo-electric sensors upon the motion of the horizontal conveyor linking the receiving and delivery station and the actuation of a mail-deflecting vane within the receiving station.

A second photocell 38 illuminated by source 40 is present in the succeeding processing equipment 42. The actions of the photocells 32 and 38 located respectively at the delivery station and in the processing equipment in controlling the operation of drive motor 44 and vane 26, as summarized in the flow diagram of FIG. 3, are pertinent at this time. Continued reference to FIG. 2 indicates that both the conveyor 24 and a flat belt 46 mounted on rollers 48 disposed in the common backplate 22 of the delivery station are driven simultaneously by drive belts 50 and 52 coupled to motor 44. In order for motor 44 to run, either photocell 32 or 38, or both of these photocells, must be light, indicating the absence of documents at their respective locations. Conversely, motor 44 will be halted only if both photocells are dark. This latter condition assures that throughput of mail will be maximized since the motion of conveyor 24 will continue until both the processing equipment 42 and the delivery station 12 contain mail. As implied hereinbefore, delivery station photocell 32 had an additional function independent from that of photocell 38, namely, the control of the vane 26.

Returning to the previous operational description and FIGS. 1 and 2, the mail pieces captured on the conveyor belt 24 in the receiving station 10 are transported on their edges into the delivery station 12 where their motion is assisted by flat belt 46. For example, in the centrally disposed selection and metering device depicted in FIG. 1, a mail piece is shown passing into the delivery station 12 through the opening 15 between the partition 13 and backplate 22. As soon as the delivery station photocell 32 is covered, the light-to-dark transition causes a signal to be supplied to the solenoid actuator 30, resulting in vane 26 being moved forward to again cover the conveyor belt 24. It should be observed that in this last position, the receiving station is self purging, that is, the mail pieces cannot back up above the station, and instead continue down to the bypass chute 36. In keeping with the photocell motor control described hereinbefore, conveyor 24 will continue to move documents toward the processing equipment 42, unless or until, the processing equipment photocell 38 experiences a light-to-dark transition, indicating that one or more documents have been received. Should delivery station photocell 32 again become uncovered during this operation, vane 26 would be retracted to capture more documents, and the conveyor 24 and flat belt 46 continue to move to transport them into the delivery station.

Most thick objects, such as small parcels, rolls and slugs, will not be captured by the shelf because of their size, shape, and location of center of gravity. This material, is collected by the bypass chute 36 and is removed from circulation. On the other hand, bypass mail of other types also pass into the bypass chute, but are ultimately returned to the input conveyor 14 for one for more additional excursions into the receiving station, depending upon the throughput required by the processing equipment.

In conclusion, a device has been described for providing an initial metered culling function applicable to collection-type mail. As such, the device has general utility in a wide range of mail processing systems. It should be understood that changes and modifications of the device may be needed to suit particular requirements. Such changes and modifications insofar as they are not departures from the true scope of the invention, are intended to be covered by the claims appended hereto.

What is claimed is:

1. A device for culling from a batch of collection mail limited quantities of predetermined types of said mail and for furnishing the same to succeeding processing equipment, said device comprising in combination:

at least one receiving station for receiving said collection mail, a delivery station disposed in contiquity with said receiving station but partially separated therefrom by a partition, said receiving station and said delivery station having a common inclined backplate, a transport comprised of a narrow belt situated at the lower extremity of said common backplate for linking said last mentioned stations to each other, said partition having an opening adjacent said backplate of sufficient magnitude to permit said transport to carry edge-oriented mail from said receiving station into said delivery station, a vane-like member movably disposed in the portion of said backplate lying within said receiving station, said vane-like member having one of its extremities hinged along said backplate and its opposite extremity in proximity to said transport, said member being capable of assuming either of two positions, a first of said positions in which said vane-like member is retracted flush with said backplate thereby permitting mail received by said receiving station to slide down said backplate and be caught by said transport, and a second position in which said lower extremity of said vane-like member is extended outward thereby covering said transport and precluding the depositing of any mail thereon, and means for selectively actuating said vane-like member to cause it to assume one of said positions as a function of the status of said delivery station, the absence of mail in said last station causing said vane-like member to assume said retracted position while the presence of mail, causing said member to assume said extended position.

2. A device as defined in claim 1 further including flat belt conveyor means mounted substantially flush with the backplate in said delivery station for contacting the planar surfaces of said mail and assisting said transport in conveying mail within said delivery station.

3. A device as defined in claim 2 wherein said means for selectively actuating said vane-like member includes a photocell sensor disposed in the backplate in said delivery station and positioned downstream from said flat belt conveyor means for providing electrical signals indicative respectively of the presence and absence of mail in said last-mentioned station.

4. A device as defined in claim 3 wherein said means for actuating said vane-like member further includes a solenoid coupled thereto, said photocell sensor in said delivery station providing signals to said solenoid to effect the energization thereof.

5. A device as defined in claim 4 further characterized in that said processing equipment for receiving mail exiting said device includes a photocell sensor for providing signals indicative respectively of the presence and absence of mail therein.

6. A device as defined in claim 5 further including drive motor means coupled in common to both said transport and said flat belt conveyor means for causing the concurrent motion thereof, said drive motor means being electrically coupled to both the photocell sensors situated respectively in said delivery station and said processing equipment, the operation of said drive motor means and concomitant motion of said transport and flat belt conveyor means being halted when, and only when, the respective signals from said photocell sensors indicate the presence of mail at both said delivery station and said processing equipment.

7. A device as defined in claim 6 further including a chute situated below said receiving station for accepting all the mail not captured within said station either by reason of its physical characteristics or because said vane-like member is in an extended position.

8. A device as defined in claim 7 wherein said transport is comprised of a horizontally oriented belt having a width of approximately $\frac{1}{4}$ to $\frac{1}{2}$ inch.

9. A device as defined in claim 8 characterized in that it comprises a plurality of sets of receiving stations and delivery stations arranged in side-by-side relationship.

10. A device as defined in claim 9 further including a pair of rollers, each of which is mounted between adjacent receiving stations and longitudinally disposed along the extremity of said backplate opposite said transport, motor drive means coupled to said rollers such that motion of said motor causes said rollers to turn in directions that tend to substantially uniformly disperse said collection mail into said plurality of receiving stations.

* * * * *